(12) United States Patent
Chaoweeraprasit et al.

(10) Patent No.: US 7,925,091 B2
(45) Date of Patent: Apr. 12, 2011

(54) DISPLAYING TEXT OF A WRITING SYSTEM USING SYNTAX-DIRECTED TRANSLATION

(75) Inventors: Worachai Chaoweeraprasit, Redmond, WA (US); Zhanjia Yang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 11/731,340

(22) Filed: Mar. 30, 2007

(65) Prior Publication Data
US 2008/0240567 A1    Oct. 2, 2008

(51) Int. Cl.
*G06K 9/18*    (2006.01)
(52) U.S. Cl. ........................................ 382/182
(58) Field of Classification Search .................. 382/182, 382/185–187, 203
See application file for complete search history.

(56) References Cited

U.S. PATENT DOCUMENTS

| 5,416,898 | A | * | 5/1995 | Opstad et al. | 345/468 |
| 5,526,477 | A | * | 6/1996 | McConnell et al. | 345/467 |
| 5,541,838 | A | * | 7/1996 | Koyama et al. | 704/4 |
| 7,251,667 | B2 | * | 7/2007 | Atkin | 1/1 |
| 2007/0257919 | A1 | * | 11/2007 | Arsenault et al. | 345/467 |

OTHER PUBLICATIONS

Juang, et al. "Resolving the unencoded character problem for Chinese digital libraris", ACM, Jun. 2005, pp. 311-319.*
"Guidelines for writing system support", SIL International, Inc, 2003, pp. 1-10.*

* cited by examiner

*Primary Examiner* — Daniel G Mariam

(57) ABSTRACT

A method for displaying an input string of character codes as a sequence of glyphs. In one implementation, an ordered list of instructions for transforming an input string of character codes may be generated using syntax-directed translation. The ordered list of instructions may be executed to generate a sequence of glyph indices. A sequence of glyphs corresponding to the sequence of glyph indices may be displayed.

20 Claims, 3 Drawing Sheets

DISPLAYING TEXT OF A WRITING SYSTEM USING SYNTAX-DIRECTED TRANSLATION

BACKGROUND

As computing systems become available throughout the world, the ability to display complex writing systems becomes increasingly important. In general, the process of displaying text includes analyzing an input string of character codes according to a particular writing system, transforming the input string of character codes into a sequence of glyph indices and displaying the sequence of glyphs on a graphical device. Character codes are numerical designators for characters defined by Unicode, an industry standard list of approximately one million characters and their associated numerical designators designed to allow symbols from various writing systems in the world to be consistently represented and manipulated by computers.

A writing system may be defined as a symbolic system used to represent statements expressible in human language. A glyph index may be defined as the zero-based integral value used to refer to a particular glyph, or shape given in a particular typeface to a symbol of a writing system. For example, glyph indices may represent letters of the alphabet, punctuation, symbols, and the like. Further, glyph indices may represent elements used to form complex combinations of glyph indices representing characters in writing systems such as Hindi or Chinese. The process of displaying text may be understood as the computing system receiving the Unicode character codes from the input keystrokes, mapping those character codes to appropriate glyph indices for a particular writing system and displaying the glyphs. For some writing systems, such as English, the mapping process is a simple one to one mapping. However, in other writing systems, such as Hindi, the mapping process may be very complex with ten character codes mapping to five glyph indices in a different order than inputted.

Typically, the input string of character codes may be analyzed by complex custom code and transformed into a sequence of glyph indices. Each writing system supported by a computing system requires extensive custom code to handle the intricacies of that writing system. Therefore, the effort required to encode, test and maintain each writing system is monumental, requiring huge amounts of time and money. Moreover, the custom code is not extendable such that new writing systems cannot be easily added. A need exists for a new way in which an input string may be analyzed and transformed into a sequence of glyph indices.

SUMMARY

Described herein are implementations of various technologies for a method for displaying an input string of character codes as a sequence of glyphs. In one implementation, an ordered list of instructions for transforming the input string may be generated using syntax-directed translation. The ordered list of instructions may be executed to generate a sequence of glyph indices which may be displayed as a sequence of glyphs. The ordered list of instructions may include one or more commands to direct the mapping of the input string into the sequence of glyphs. A writing system analyzer may generate the ordered list of instructions after receiving and analyzing the input string. The writing system analyzer may be generated by compiling a syntax-directed translation representation of a writing system. A writing system may be represented in syntax-directed translation by creating an environment for representing the writing system in syntax-directed translation and formulating one or more rules for representing the writing system in syntax-directed translation.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
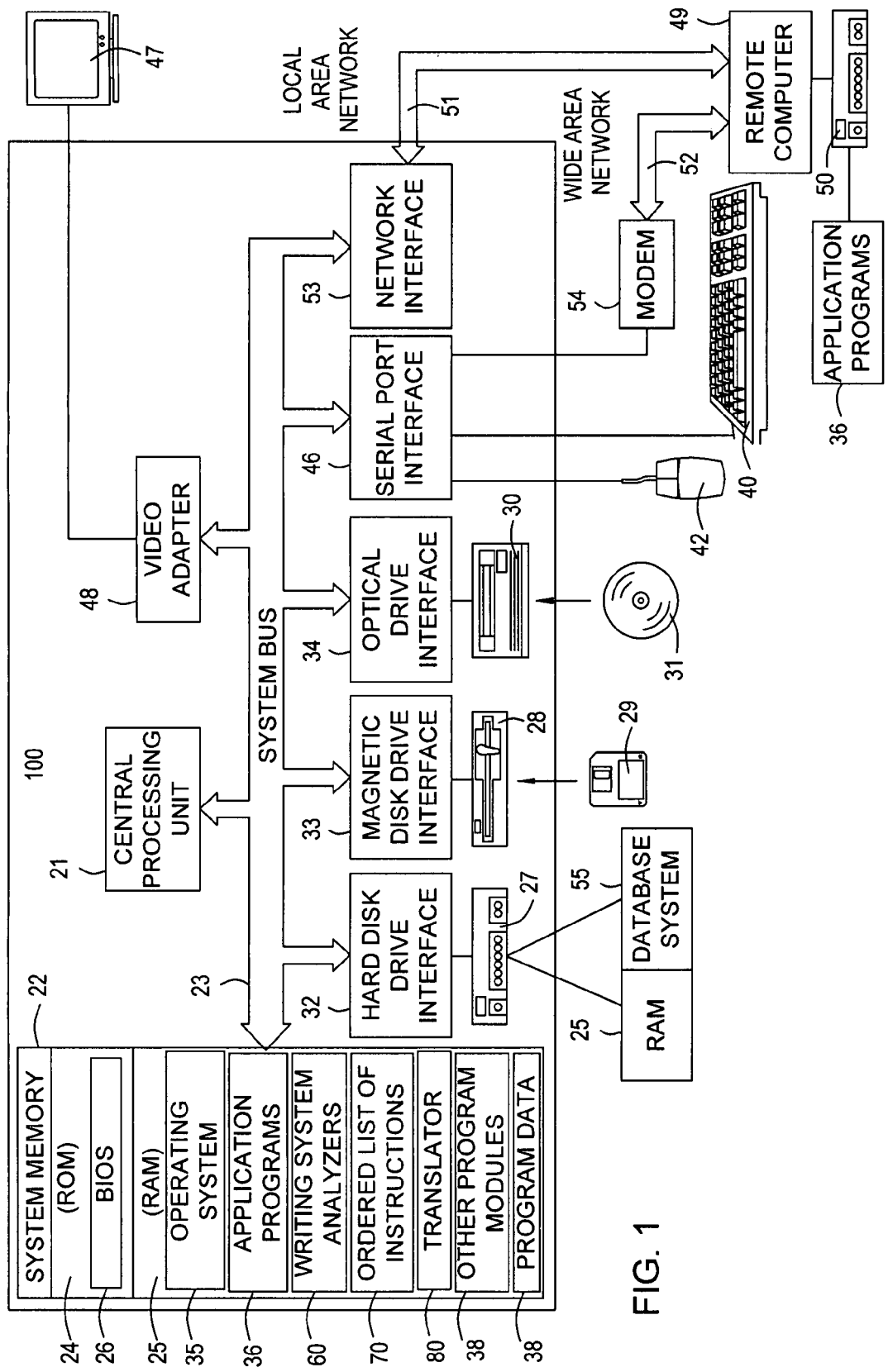
FIG. 1 illustrates a schematic diagram of a computing system in which the various technologies described herein may be incorporated and practiced.

In general, one or more implementations of various technologies described herein may be directed to a method for analyzing an input text string and displaying a sequence of glyphs using syntax-directed translation. Syntax-directed translation may be defined as a method of analyzing a text string and generating an ordered list of instructions used to map the text string into a sequence of glyph indices. Syntax-directed translation may be applied by formulating context-free grammar rules and attaching one or more instructions to each rule. Thus, analyzing a text string using the context-free grammar rules produces an ordered list of instructions to map the text string into a sequence of glyph indices. A context-free grammar may be defined as the mathematical representation of rules that govern structural patterns. As such, syntax-directed translation may be used as a method for defining how to analyze a set of strings representing a formal language, i.e., a language defined by mathematical formulas, and generate an ordered list of instructions to map the set of strings into a sequence of glyph indices.

In one or more implementations of various technologies described herein, a writing system analyzer may be used to parse or analyze an input string of Unicode character codes to determine its grammatical structure with respect to a writing system. The writing system analyzer may generate an ordered list of instructions describing how to map the input string into a sequence of glyph indices. A translator may then be used to execute the ordered list of instructions and display the sequence of glyphs. Various techniques for a method for analyzing an input text string and displaying a sequence of glyphs using syntax-directed translation in accordance with various implementations are described in more detail with reference to FIGS. 1-3 in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk, magnetic disk 29, optical disk 31, ROM 24 or RAM 25, including an operating system 35, one or more application programs 36, writing system analyzers 60, an ordered list of instructions 70, a translator 80, other program modules 37, program data 38 and a database system 55. The operating system 35 may be any suitable operating system that may control the operation of a networked personal or server computer, such as Windows® XP, Mac OS® X, Unix-variants (e.g., Linux® and BSD®), and the like. The writing system analyzers 60, the ordered list of instructions 70 and the translator 80 will be described in more detail with reference to FIGS. 2 and 3 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices, such as speakers and printers.

Further, the computing system 100 may operate in a networked environment using logical connections to one or more remote computers, such as a remote computer 49. The remote computer 49 may be another personal computer, a server, a router, a network PC, a peer device or other common network node. Although the remote computer 49 is illustrated as having only a memory storage device 50, the remote computer 49 may include many or all of the elements described above relative to the computing system 100. The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
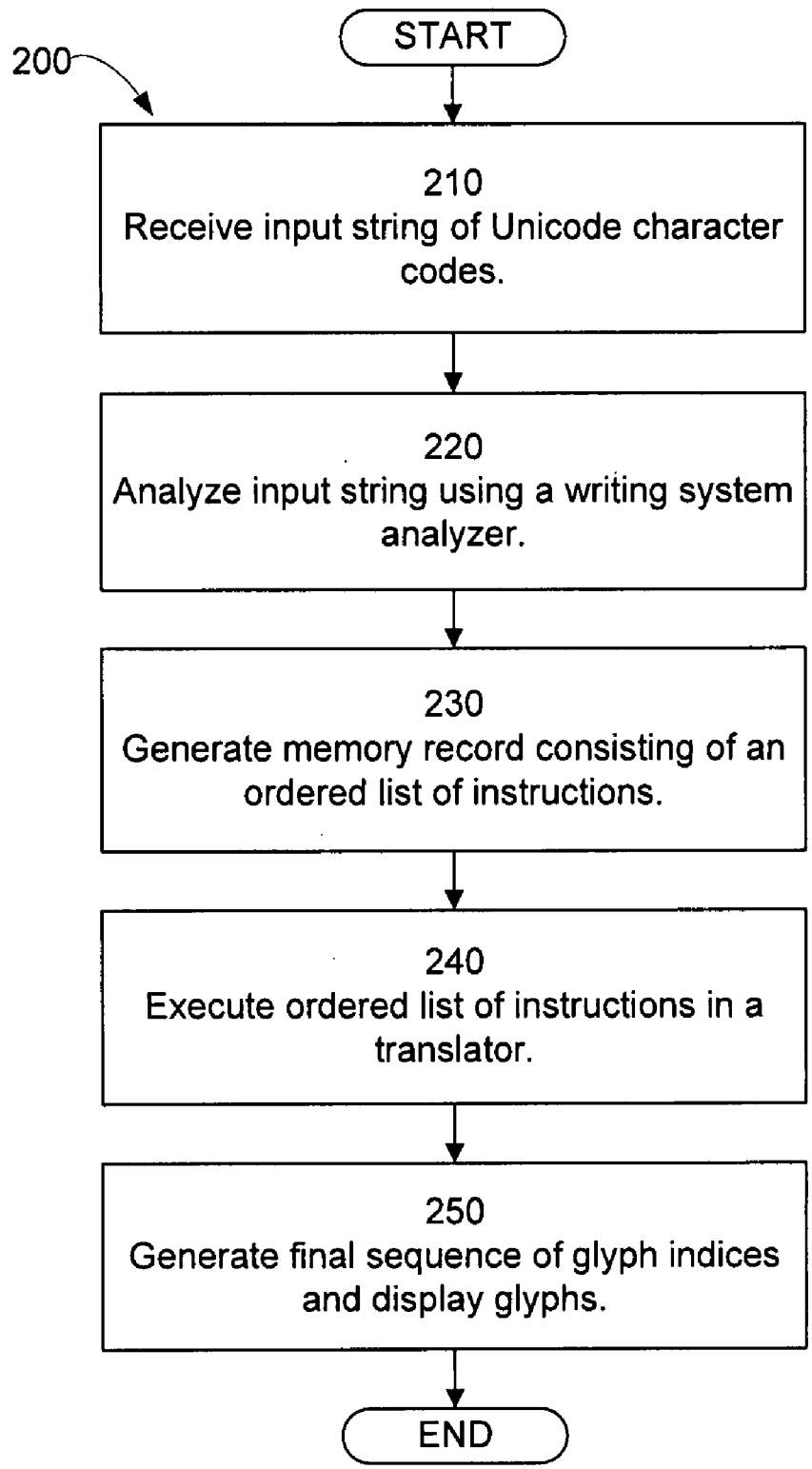
FIG. 2 illustrates a flow diagram of a method for analyzing an input text string and displaying a sequence of glyphs using syntax-directed translation in accordance with implementations of various technologies described herein.
Figure 3:
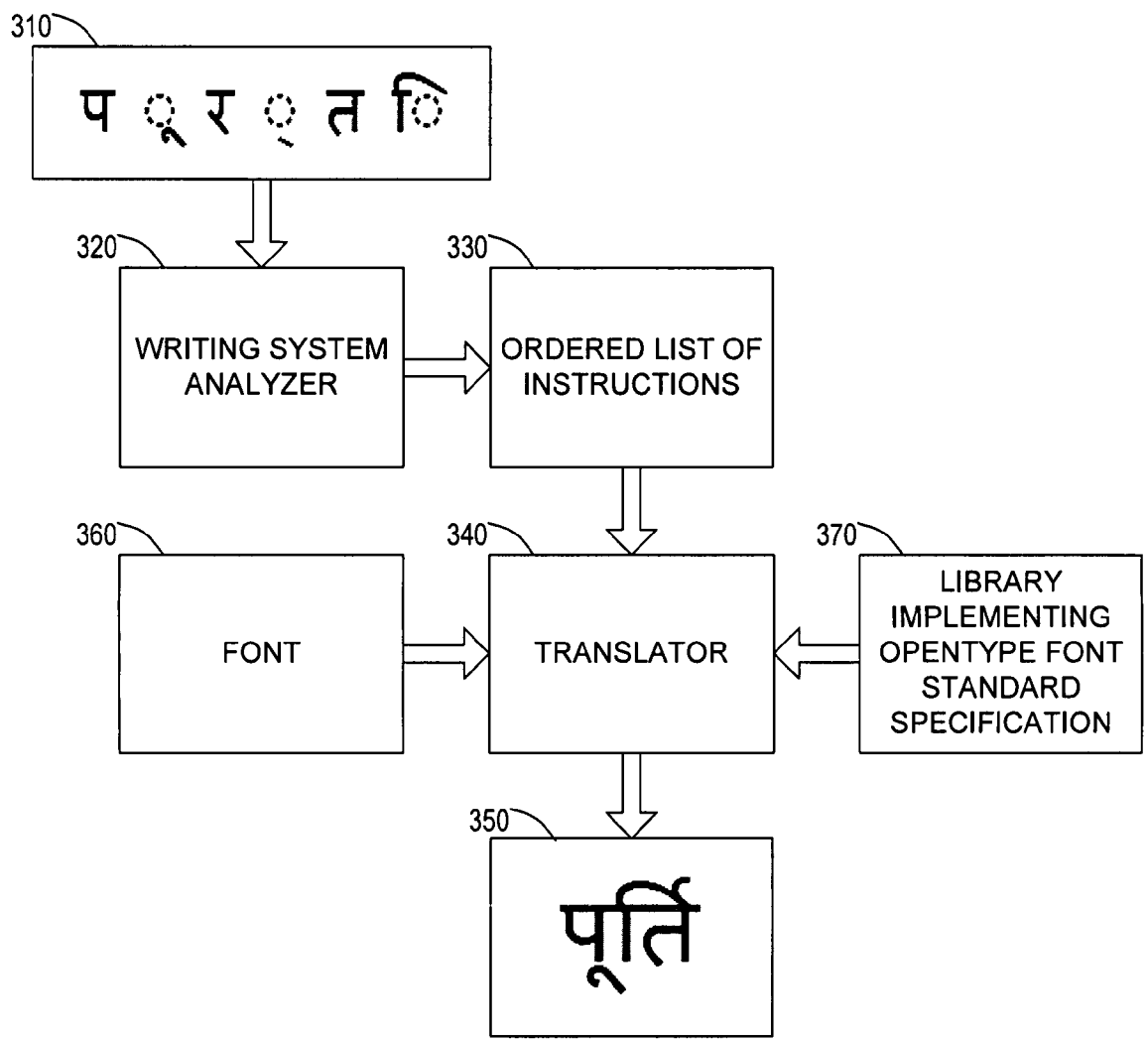
FIG. 3 illustrates a schematic of a method for analyzing an input text string and displaying a sequence of glyphs using syntax-directed translation in accordance with implementations of various technologies described herein.

FIG. 2 illustrates a flow diagram of a method 200 for analyzing an input text string and displaying a sequence of glyphs using syntax-directed translation in accordance with implementations of various technologies described herein. It should be understood that while the operational flow diagram of the method 200 indicates a particular order of execution of the operations, in some implementations, the operations might be executed in a different order. FIG. 3 illustrates a schematic diagram for analyzing an input text string in Hindi and displaying a sequence of glyphs using syntax-directed translation in accordance with implementations of various technologies described herein.

At step 210, an input string of Unicode character codes may be received. The input string of Unicode character codes may be entered through a sequence of keystrokes, read from a persistence document file, received from a remote computer or the like. FIG. 3 illustrates six keystrokes 310 generating an input string of Unicode characters representing a word in the Hindi writing system. The keystrokes 310 may be interpreted by the computer as Unicode characters. For example, the keystrokes 310 for the input string may be interpreted as the following input string of Unicode characters: 092A, 0942, 0930, 094D, 0924, 093F. If the input string is read from a persistence document file, received from a remote computer or the like, the input string may consist of the Unicode characters without the keystrokes 310.

At step 220, the input string of Unicode characters may be analyzed by a writing system analyzer 320. A writing system analyzer 320 may be defined as an executable program designed to parse or analyze an input string of Unicode characters to determine its grammatical structure with respect to a particular writing system and to produce an ordered list of instructions 330, which describe the manner in which the input string will be mapped into a sequence of glyph indices. A writing system analyzer 320 may be writing system specific such that there may be a separate writing system analyzer for each writing system supported by a computing system.

In one implementation, the writing system analyzer 320 used to analyze the input string of Unicode characters may be auto-generated from a writing system definition. A writing system definition may be defined as a syntax-directed translation representation of a writing system. In one or more implementations, the writing system definition used to generate the writing system analyzer may be developed by establishing an environment for developing a writing system definition and constructing syntax-directed translation rules. An environment for developing a writing system definition may be established by creating an expressive language inside a programming language, such as C++, C# and the like. Within a programming language, features such as generic types, overridden operators, classes, commands to direct the formation of the sequence of glyph indices and the like may be used to create an expressive language designed to develop a writing system definition. Within the established environment to develop a writing system definition, variables necessary to describe the writing system definition may be defined. A variety of variable types may be defined such as symbols, ranges, syntax-directed translation rule titles and the like. Each writing system definition constructed may have different variable types defined as well as different specific variables defined. It should be understood that only variables necessary to construct the writing system definition may be defined. Using the template types, operator overriding and commands to direct the formation of the sequence of glyph indices along with the variables to construct the rules of a writing system, syntax-directed translation rules may be constructed. Syntax-directed translation rules may be defined as the context-free grammar representation of the rules of writing a particular human language and the attached instructions used to map a text string into the glyph indices of the human language. Syntax-directed translation rules may be very complex and include a number of attached instructions to direct the formation of the sequence of glyph indices. Further, the writing system definition may include many syntax-directed translation rules.

The writing system definition may then be compiled by a compiler to auto-generate the executable code for a writing system analyzer 320. The writing system analyzer 320 may be a recursive-descendent analyzer program of the writing system defined by the syntax-directed translation. In this manner, a writing system analyzer 320 may be generated for any writing system that may be represented in syntax-directed translation. Because syntax-directed translation source code may be compiled to auto-generate an analyzer, representing a writing system using syntax-directed translation leverages compiler techniques to allow a writing system analyzer 320 to be auto-generated, thereby eliminating the need for complex written programming language code. A writing system analyzer 320 generated from a writing system definition may also simplify parsing because syntax-directed translation may define the structural pattern of tokens, making it possible to define a syntax tree for the writing system.

At step 230, the writing system analyzer 320 may generate an ordered list of instructions 330, which describes the manner in which the input string may be changed into a sequence of glyph indices. The ordered list of instructions 330 may be held in computer memory. The ordered list of instructions 330 may not be specific to a particular font, yet it is capable of producing font-specific visual representation of the input string. Various commands to direct the formation of the sequence of glyph indices defined in the environment for developing a writing system definition and used in the writing system definition may be included in the ordered list of instructions 330. For example, the environment for developing a writing system definition may define a command, "Change", to mean "apply the specified glyph index substitution feature on the range of text at the top of the stack." The command, "Change", may be used in the writing system definition development to describe an action necessary to form the sequence of glyph indices. Finally, the command may be included in the ordered list of instructions, which describes the manner in which the input string may be changed into a sequence of glyph indices. The ordered list of instructions may further include other commands, such as "Push", "Pop", "Pushadd", "Change", "Move", "Reverse", "Basify" and the like.

Continuing with the example illustrated in FIG. 3, the input string in Hindi may be analyzed by the writing system analyzer 320 and generate an ordered list of instructions 330. The ordered list of instructions 330 for the first syllable of the input string, formed by the first two input keystrokes 310, PA (प) and matra U (ु), may be as follows.

| Push | 092A (the character code representing "प") |
| Pushadd | 0942 (the character code representing "ू") |
| Change | 'blws' |
| Move | 'blwm' |
| Pop | |

At step 240, a translator 340 may execute the ordered list of instructions 330. In executing the ordered list of instructions 330, the translator 340 may interpret the ordered list of instructions 330 independent of the writing system. The translator 340 may include a runtime library, which may include the executable code for performing one or more commands to direct the formation of a sequence of glyph indices. As mentioned in the previous paragraphs, such commands may include "Push", "Pop", "Pushadd", "Change", "Move", "Reverse", "Basify" and the like. In executing the ordered list of instructions, the translator 340 may use a stacking engine to queue the result of each instruction. In computer science, a stack may denote a temporary data structure for queuing data in which the data element that is queued up last comes out first. In one implementation, the translator 340 may rely on a font 360 and a library implementing the OpenType font standard specification 370 for glyph transformation. The font 360 may be a coordinated set of glyphs designed with stylistic unity, typically comprising an alphabet of letters, numerals, punctuation marks, ideograms and symbols. The library implementing the OpenType font standard specification 370 may be an industry standard of scalable computer fonts.

Continuing with the example illustrated in FIG. 3, the translator 340 may execute the example of an ordered list of instructions 330 provided above in paragraph [0028] for the first syllable of the input string, formed by the first two input keystrokes 310, PA (प) and matra U (ु) as follows. The translator 340 pushes an input substring representing ("प") onto the stack. The translator 340 then adds an input substring representing ("ू") to the top of the stack. The combined substring may then be used as an argument to perform glyph substitution and positioning using the typographic feature 'blws' and 'blwm' respectively. The font 360 and the library implementing the OpenType font standard specification 370 may be accessed by the translator 340 to perform the glyph substitution and positioning. The last substring, i.e., the sequence of glyph indices for the first syllable of the input string, may then be popped out of the stack.

At step 250, a sequence of glyph indices may be generated and the sequence of glyphs 350 displayed. The final appearance of the first syllable "पू" may be displayed as the first portion of the sequence of glyphs 350.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying an input string of character codes as a sequence of glyphs, comprising:
   generating an ordered list of instructions using syntax-directed translation, the generating comprising:
   formulating context-free grammar rules comprising mathematical representations of rules governing structural patterns of grammar; and
   analyzing the input string using the context-free grammar rules to generate the ordered list of instructions;
   executing the ordered list of instructions to generate a sequence of glyph indices; and
   displaying a sequence of glyphs corresponding to the sequence of glyph indices, where at least some of at least one of the generating, formulating, analyzing, executing and displaying is performed using a computer or processor.

2. The method of claim 1, wherein the ordered list of instructions is configured to map the input string into the sequence of glyphs.

3. The method of claim 2, wherein the ordered list of instructions comprises one or more commands to direct the mapping of the input string into the sequence of glyphs.

4. The method of claim 1, wherein the ordered list of instructions is generated by a writing system analyzer.

5. The method of claim 4, wherein the writing system analyzer comprises a recursive-descendent analyzer program of a writing system represented by the syntax-directed translation.

6. The method of claim 1, comprising receiving the input string and analyzing the input string using a writing system analyzer.

7. The method of claim 6, wherein the writing system analyzer is generated by:
   representing a writing system in syntax-directed translation; and
   compiling the syntax-directed translation representation of the writing system.

8. The method of claim 7, wherein representing the writing system in syntax-directed translation comprises:
   creating an environment for representing the writing system in syntax-directed translation.

9. The method of claim 1, the ordered list of instructions comprising at least one of: a push command, a pop command, a pushadd command, a change command, a move command, a reverse command, and a basify command.

10. The method of claim 1, wherein the ordered list of instructions is executed with a translator.

11. The method of claim 10, wherein the translator comprises a runtime library having executable code for performing one or more commands to direct a formation of the sequence of glyphs.

12. The method of claim 1, wherein the ordered list of instructions is executed using a runtime library of one or more commands to direct a formation of the sequence of glyphs, a stacking engine for queuing data, a font, a library implementing the OpenType font standard specification or combinations thereof.

13. A computer system configured to display an input string of character codes as a sequence of glyphs, comprising:
   a processor; and
   a memory comprising program instructions executable by the processor to:
      generate an ordered list of instructions using syntax-directed translation using a writing system analyzer by
         formulating context-free grammar rules comprising mathematical representations of rules governing structural patterns of grammar; and
         analyzing the input string of character codes using the context-free grammar rules to generate the ordered list of instructions;
      execute the ordered list of instructions to generate a sequence of glyph indices; and
      display a sequence of glyphs corresponding to the sequence of glyph indices.

14. The computer system of claim 13, wherein the writing system analyzer is generated by:
   representing a writing system in syntax-directed translation; and
   compiling the syntax-directed translation representation of the writing system.

15. The computer system of claim 13, wherein the ordered list of instructions is configured to map the input string into the sequence of glyphs.

16. The computer system of claim 15, wherein the ordered list of instructions comprises one or more commands to direct the mapping of the input string into the sequence of glyphs.

17. A computer recording device comprising computer executable instructions that when executed via a microprocessor perform a method for displaying an input string of character codes as a sequence of glyphs comprising:
   generating an ordered list of instructions using syntax-directed translation, the generating comprising:
      formulating context-free grammar rules comprising mathematical representations of rules governing structural patterns of grammar; and
      analyzing the input string using the context-free grammar rules to generate the ordered list of instructions;
   executing the ordered list of instructions to generate a sequence of glyph indices; and
   displaying a sequence of glyphs corresponding to the sequence of glyph indices.

18. The computer recording device of claim 17, wherein the instructions are independent of a font.

19. The computer recording device of claim 17, wherein the instructions comprise one or more commands to direct a formation of the sequence of glyphs.

20. The computer recording device of claim 19, wherein the instructions associate character codes with the commands to direct the formation of the sequence of glyphs.

\* \* \* \* \*